United States Patent
Krebs

(10) Patent No.: US 8,230,383 B2
(45) Date of Patent: Jul. 24, 2012

(54) METHOD FOR THE CONSTRUCTION OF FLEXIBLE PRINTED CIRCUIT BOARDS

(76) Inventor: Thomas Krebs, Nuremberg (DE)

( * ) Notice: Subject to any disclaimer, the term of this patent is extended or adjusted under 35 U.S.C. 154(b) by 221 days.

(21) Appl. No.: 12/670,737

(22) PCT Filed: Jul. 25, 2008

(86) PCT No.: PCT/EP2008/006156
§ 371 (c)(1),
(2), (4) Date: Mar. 1, 2010

(87) PCT Pub. No.: WO2009/013013
PCT Pub. Date: Jan. 29, 2009

(65) Prior Publication Data
US 2011/0016446 A1    Jan. 20, 2011

(30) Foreign Application Priority Data
Jul. 26, 2007 (DE) .......................... 10 2007 035 457

(51) Int. Cl.
*G06F 17/50* (2006.01)
(52) U.S. Cl. ........................................ 716/137; 716/100
(58) Field of Classification Search .......... 716/100–102, 716/137
See application file for complete search history.

(56) References Cited

U.S. PATENT DOCUMENTS

2002/0173867 A1    11/2002  Duncan
2005/0287871 A1    12/2005  Nakayama et al.

FOREIGN PATENT DOCUMENTS

JP    2006040265    2/2009

OTHER PUBLICATIONS

Krebs et al., "Design of Integrated Electronic/Mechanical Products", Elektronik Weka-Fachzeitschriften, Germany, Bd. 54, Nr. 18, (Sep. 6, 2005).
Feldmann, et al., "Computer-Aided Planning Systems for Integrated Electronic and Mechanical Design", IEEE Transactions on Components, Hybrids, and Manufacturing Technology, IEEE Inc. New York, US, Bd. 16, Nr. 1 (Jun. 1, 1993).

*Primary Examiner* — Nghia Doan
*Assistant Examiner* — Binh Tat
(74) *Attorney, Agent, or Firm* — Hoffmann & Baron, LLP

(57) ABSTRACT

A description is given of a method for the computer-aided construction of flexible printed circuit boards that are arranged in a housing (10) of a device. The method provides a 3D model for determining the fixed points (1 to 4) of the printed circuit board, such as fastening points and connecting points, and a 2D model based on a development of a skeleton model (20) of the printed circuit board, for creating a printed circuit board design (40) comprising a printed circuit board contour and a printed circuit board layout. The two development environments are uniquely assigned to one another.

18 Claims, 3 Drawing Sheets

METHOD FOR THE CONSTRUCTION OF FLEXIBLE PRINTED CIRCUIT BOARDS

This application claims priority based on an International Application filed under the Patent Cooperation Treaty, PCT/EP2008/006156, filed on Jul. 25, 2008 and German Application No. DE102007035457.8, filed on Jul. 26, 2007.

BACKGROUND OF THE INVENTION

The invention relates to a method for the construction of flexible printed circuit boards and flexible connecting lines.

Flexible printed circuit boards are used in numerous devices including, increasingly, in components determined for automobiles.

Printed circuit boards are designed with the aid of computers and so-called printed circuit board CAD systems that enable a two-dimensional representation of the printed circuit board. Three-dimensional representations are possible, but they relate exclusively to the three-dimensional representation of flat printed circuit boards. The printed circuit board CAD systems are tailored to the design of electrical and/or electronic circuits, that is to say may enable, inter alia, the routing of the connecting lines.

Available for mechanical systems are CAD systems that enable three-dimensional structures to be designed. However, they are not capable of taking account of the logic and electrical aspects of electronic components and modules. It is therefore customary in the course of processing to exchange data between the two systems, although the intersection set between the two systems is smaller than the data set required for the design and development process.

Consequently, for example, recourse is made to methods that interpret the flexible printed circuit board as a bent sheet metal part so that it is essentially possible to produce box shaped structures. It is, furthermore, disadvantageous that there is a need to run through the adaptation process several times, thus resulting in a high time outlay.

SUMMARY OF THE INVENTION

It is an object of the present invention to specify an improved method for the design of flexible printed circuit boards.

According to the invention, this object is achieved with the aid of the subject matter of claim 1. A method is proposed for the computer aided construction of flexible printed circuit boards that are arranged in a housing of a device, it being provided that the following steps are run through once or several times:
a) creating a 3D model of the housing,
b) determining fixed points of the printed circuit board, such as fastening points and connecting points, with specification of the normal unit vector pointing away from the top side of the flexible printed circuit board, and of the throughflow direction,
c) determining connecting planes that contain the fixed points,
d) calculating a skeleton model of the printed circuit board, the line of intersection of the connecting planes having the fixed points being determined between two neighboring fixed points with a different normal unit vector,
e) replacing the line of intersection by a connecting segment, the connecting planes forming the line of intersection merging tangentially into the connecting segment,
f) creating a development of the skeleton model,
g) defining a preliminary printed circuit board contour including the skeleton model,
h) creating a printed circuit board design, comprising a defined printed circuit board contour and a printed circuit board layout, in the development,
i) inserting virtual components into the printed circuit board design,
k) back transfer of the printed circuit board design populated with the virtual components into the 3D model of the housing,
l) determining and correcting the collisions between the virtual components, on the one hand, and the printed circuit board contour or the inner contour of the housing in the 3D model of the housing, on the other hand, or between the virtual components among one another, or the printed circuit board contour with itself,
m) running through the steps h) to k) until no more collisions occur, the steps a) to m) being executed in the abovenamed sequence or in another sequence.

The term "virtual component" indicates that what is involved in the design phase is not a real component, but a model of the real component that comprises at least the outer contour of the real component, that is to say geometric data, as well as electromagnetic data that simulate the interaction of the real component with neighboring components. For example, a model of an electromagnetic transformer, for example a low frequency transformer, can have, in addition to its geometric shape (connecting pins, outer contour), data relating to its electromagnetic stray field that, for example, can affect a neighboring electromagnetic transformer as an electromagnetic interference field, as well as thermal properties, for example data relating to heat losses dissipated during operation of the transformer.

The method step a)—the creation of the three-dimensional model of the housing with the desired profile of the printed circuit board—is, like the method step b)—determination of fixed points of the printed circuit board, such as fastening points and connecting points, with specification of the normal unit vector pointing away from the top side of the flexible printed circuit board, and of the throughflow direction—is provided for the purpose of determining output values for the following method steps. In the further method, however, it is possible to provide corrections to the output values without bringing the method into question. The extent of possible corrections is dependent, inter alia, on whether a finished housing is present, or whether the housing is also present only as a design.

Thus, for example, a correction of the fastening points of the printed circuit board can be required because after the design of the printed circuit board layout one or more components impede the free access to the fastening points whose position cannot be varied in order to satisfy functional conditions.

It is also possible to process method steps completely or partially in another sequence without departing from the inventive method. For example, it is possible firstly to execute the method step d)—calculation of a skeleton model of the printed circuit board—, and then to provide the method step c)—determination of connecting planes that contain the fixed points—, or both method steps can be carried out as an iterative process.

It is known to be a feature of the design development process that returns to preceding development steps can be provided but are, however, to remain restricted to individual cases from economic considerations. The inventive method is distinguished in that the design of the flexible printed circuit board is undertaken both in a three dimensional and in a two dimensional development environment, and that both development environments are linked to one another determinately. In the method step a), the creation of the 3D model of the housing, salient housing points are determined as three dimensional coordinates, it being possible in method step b) for the fixed points that are to be determined either to be already contained in the set of the salient housing points, or to be added to this set.

Consequently, it is possible in general to carry out the printed circuit board design in a targeted fashion after the creation of the skeleton model, and the optimum development environment is provided for each development step. A 2D embodiment is provided for determining the printed circuit board contour and the printed circuit board layout, while a 3D environment is provided for determining and correcting collisions. The timing for the compilation of the production documents for the printed circuit board can thereby be significantly shortened.

It can be provided that in method step a) the 3D model of the housing is stored in a data memory of a computer, and that in method step b) the fixed points of the printed circuit board are taken from the data memory.

Furthermore, it can be provided that the skeleton model calculated in method step d) is stored in the data memory of the computer.

It can also be provided that the virtual components are stored in the data memory of the computer.

It may be seen that although the method steps of the inventive method relate to physical elements such as printed circuit boards or components, in the development process said elements are stored as numerical data in data memories of the computer. These data can, for example, go beyond the geometric properties of the electronic component and be combined in a virtual component. Different forms of data representation can be provided for interaction with a human developer, for example two dimensional and/or three dimensional graphic display on a screen, or a tabular presentation of parameters or measured values. Data can preferably be processed in the computer by means of one or more programs, but it is also possible to interrogate the developer engaged in the computer as to decisions that control the further development process.

Further advantageous designs are directed to the connecting segments.

It can be provided that the connecting segment is designed as a curved surface.

It can advantageously be provided that the curved surface is designed as a cylindrical surface, preferably as a section of a hollow cylinder. The cylindrical surface is determined by the cylinder radius and the axial direction, while the determination of the tangential transition into flat segments of the printed circuit board involves a small amount of calculation. Furthermore, the cylindrical surface has the advantage that as a consequence of the constant radius of curvature there is no need for any additional measures to fix the flexible printed circuit board in order to construct the cylindrical surface to last.

Furthermore, it can be provided that the connecting segment is designed as a conical surface, preferably as a section of a hollow conical frustum. The conical surface has different radii of curvature that decrease with increasing distance from the base of the cone or of the conical frustum. Consequently, stresses can be formed in the material of the flexible printed circuit board that counteract the deformation such that, in some circumstances, additional fixing points require to be provided in the connecting segment and/or in the surroundings of the connecting segment in order to fix the printed circuit board.

In a further advantageous design, it can be provided the connecting segment is designed as a helical surface. A helical surface can be provided, for example, in order to compensate longitudinal movements or rotary movements that can, for example, occur when there are housing components that can be withdrawn or pivoted.

It can further be provided that the connecting segment is designed as a spiral surface. Such a connecting segment can, for example, be provided as an alternative to the above-described connecting segment designed as a helical surface, it further being possible also to provide that the spiral surface can be drawn apart if required to form a helical surface, for example in order to design one or more housing components passed through by the flexible printed circuit board in a fashion capable of being both withdrawn and pivoted.

It can advantageously be provided that radii of curvature are selected that are larger than the radius of curvature and in which the linear elasticity range of the printed circuit board material is departed from for a predetermined printed circuit board thickness.

It can be provided that the permissible radii of curvature are selected from a preference table. The preference table can be stored as a data record that can be accessed by design software working in accordance with the inventive method.

It can be provided that two consecutive parallel connecting planes are connected by an orthogonal connecting plane. However, it is also possible to provide a connecting plane of different profile, particularly when the inner contour of the housing intended for holding the flexible printed circuit board enforces or suggests a different profile.

It can also be provided that two consecutive nonparallel connecting planes are connected by a twisting surface. The twisting surface can advantageously be determined such that the flexible printed circuit board assumes the predetermined surface contour without the action of external forces.

It can advantageously be provided that the twisting surface is formed by a twisting radius that is larger than the twisting radius for which the linear elasticity range of the printed circuit board material is departed from.

In a further advantageous design, in the method step 1) impermissible mutual electromagnetic and/or thermal influences of the components and/or conductor tracks arranged on the flexible printed circuit board are determined and corrected. It is possible for no influences to occur in the development of the printed circuit board because the critical components on the developed printed circuit board have so large a spacing that an influence does not occur or can be neglected. However, in the installed state of the printed circuit board the components can be brought so close to one another that the influence does occur and cannot be neglected. Transformers, in particular high frequency transformers and resonant circuits, can be critical components or modules, for example. As set forth above, in the design process the components are virtual components. However, it is possible that the virtual component does not image all the relevant properties of the real component. Consequently, it is impossible to preclude measurements made on a production pattern populated with real components from exhibiting deviations relative to the parameters calculated on the model populated with virtual components. However, necessary changes can easily be undertaken at any time with the inventive method, it advantageously being possible to provide future use of a virtual component with an improved model structure.

It can also be provided that the printed circuit board contour is selected such that no overlapping region of connecting segments is arranged inside the printed circuit board contour. The consequence of this would be that the flexible printed circuit board would have to be bent repeatedly in such regions, bending which can lead in general to plastic deformation and cracks.

It can be provided that the method is applied to ribbon cable or to bundles of circular conductor cables. Although the laying of cables presents fewer problems, it is still possible for the inventive method also to be advantageously applied to cables or cable harnesses.

BRIEF DESCRIPTION OF THE DRAWINGS

The invention will now be explained in greater detail with the aid of exemplary embodiments. In the drawing.

DETAILED DESCRIPTION OF THE INVENTION

Figure 1:
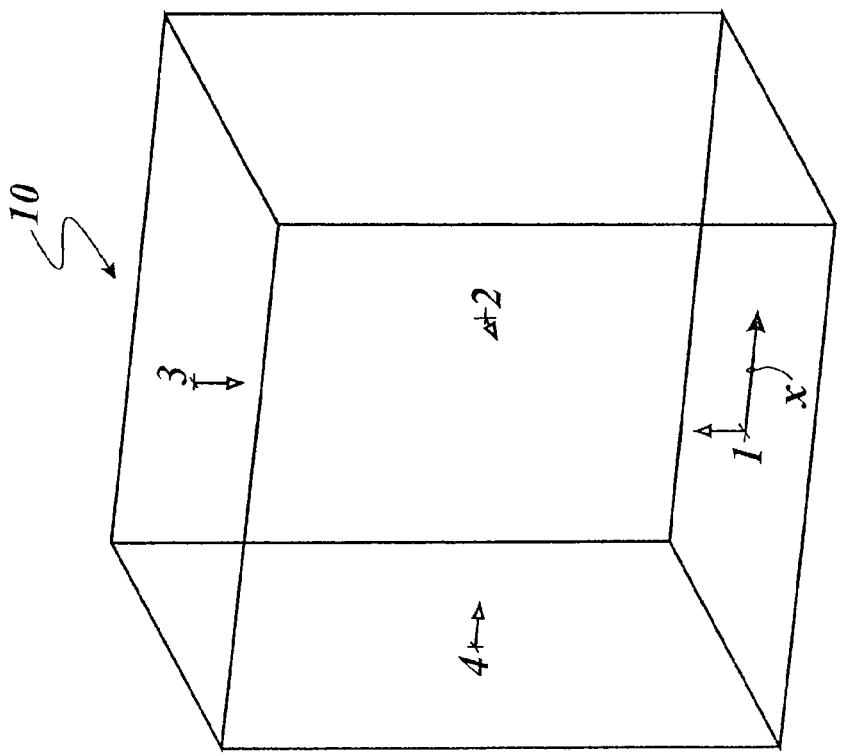
FIG. 1 is a three dimensional schematic of a housing provided for the installation of a flexible printed circuit board, fixed points being depicted.

FIG. 1 shows a skeleton model of a cuboid housing 10 that is intended for the installation of a flexible printed circuit board. The skeleton model has no wall thickness, and encloses the inner space of the housing 10. Provided in the housing are fixed points 1 to 4 on which there is respectively depicted a normal unit vector erected on the inner wall surface and pointing inward. The skeleton model of the housing 10 can, for example, be derived from a physical model of the housing. However, it can also be derived from a graphic display of the housing 10, for example from two-dimensional views and/or sections such as are customary for design drawings, or else from a three-dimensional display, preferably from dimensioned displays. The fixed points 1 to 4 of the printed circuit board are preferably prescribed by the developer of the housing from technical points of view.

Furthermore, the fixed point 1 is the origin of a Cartesian coordinate system but later provides the connection between the housing 10 displayed in a three-dimensional view and printed circuit board designs displayed in a two-dimensional view.

The fixed points 2 to 4 are consequently uniquely assigned to one another as points $P_i = P_i(x_i, y_i, z_i)$ in the 3D view, or $P_i' = P_i'(x_i, y_i)$ in 2D view.

Figure 2:
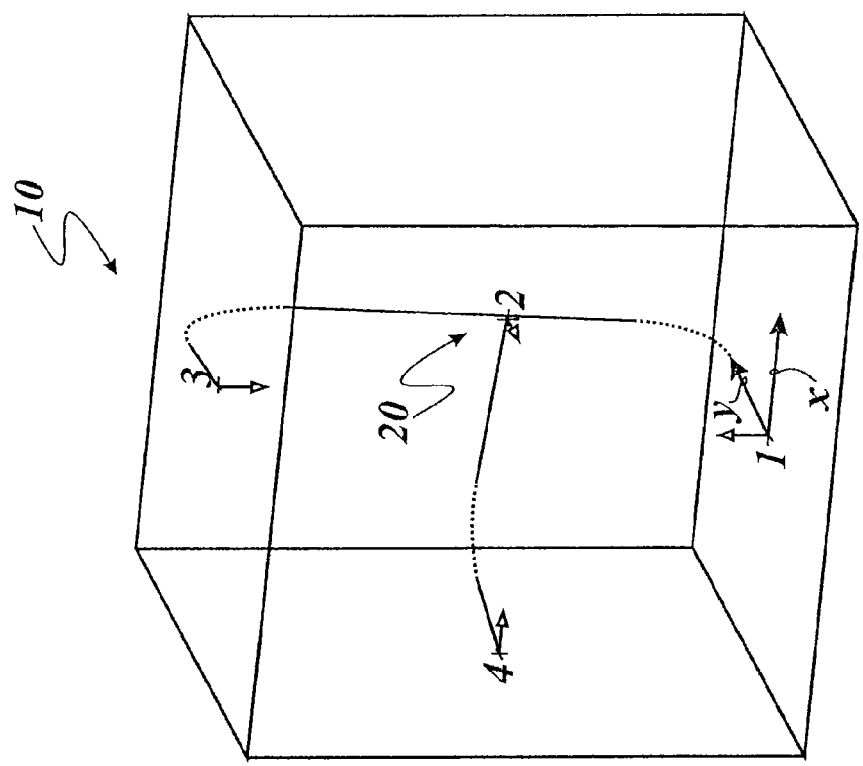
FIG. 2 is a three dimensional schematic of a skeleton model, introduced into the housing in FIG. 1, of the flexible printed circuit board.

FIG. 2 shows a three-dimensional skeleton model 20, developed from the fixed points 1 to 4, of the flexible printed circuit board that has straight and curved segments. The segments of the skeleton model belong to connecting planes that respectively contain at least one of the fixed points. The connecting planes can, for example, form planes parallel to the inner walls of the housing 10, as illustrated in FIG. 2.

The line of intersection of the connecting planes having the fixed points is now determined between two neighboring fixed points with a different normal unit vector. In the exemplary embodiment illustrated in FIG. 2, the lines of intersection coincide with the inner edges of the housing 10.

As illustrated further in FIG. 2, the lines of intersection are replaced by a curved connecting segment that is respectively designed in the skeleton model 20 as a circular arc segment. The curved connecting segments in the exemplary embodiment illustrated in FIG. 2 are thus lateral segments of circular cylinders. This design of the connecting segment can be preferred because of the constant curvature of circular cylinders, it being possible to select a radius of curvature determining the curvature of the connecting segment such that it corresponds to the minimum permissible radius of curvature for which no permanent deformation or no buckling of the printed circuit board material occurs. The minimum permissible radius of curvature can be stored in a database of a computer aided design program as a function of the type of material and the printed circuit board thickness.

Figure 3:
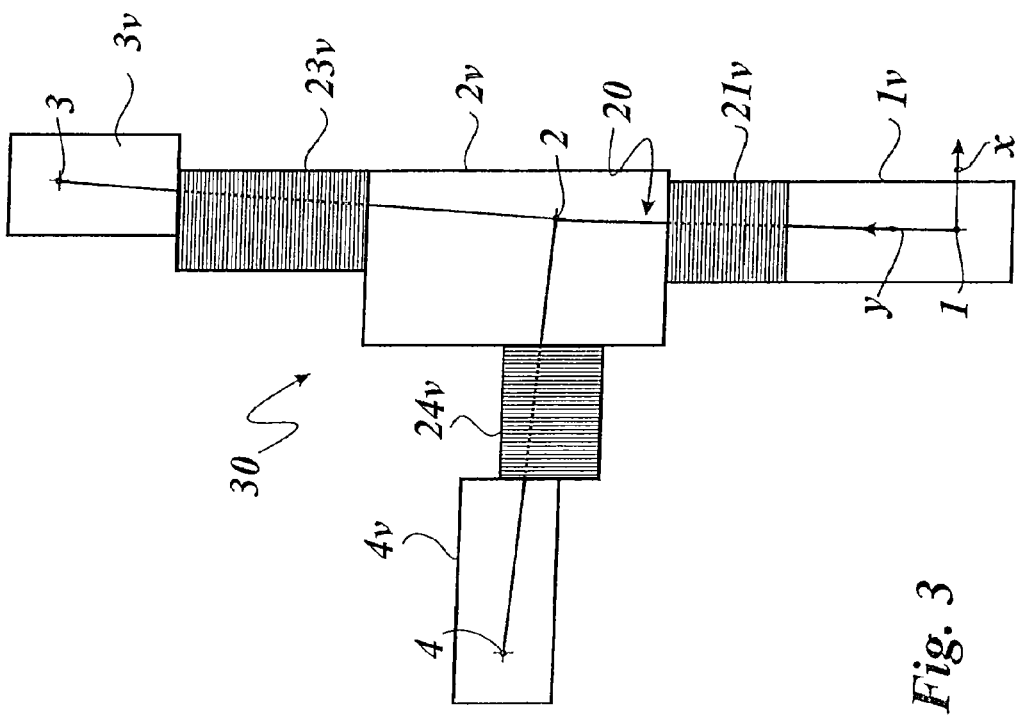
FIG. 3 is a schematic plan view of a first printed circuit board design developed from the skeleton model in FIG. 2.

FIG. 3 shows the skeleton model 20 developed in a plane, such as can also be illustrated, for example, in a 2D printed circuit board layout program, only the x- and y-coordinates of the coordinate system illustrated in FIG. 2 and erected at the fixed point 1 being depicted. The z-coordinate could appear, if required, as a height datum in such a 2D display. The fixed points 1 to 4 and the skeleton model 20 respectively have a height of zero. Each of the fixed points 2 to 4 can be described as a point $P_i' = P_i'(x_i, y_i)$, and linked uniquely to the three-dimensional display provided in FIG. 2, as described further above.

Also illustrated in FIG. 3 are connecting planes $1v$ to $4v$ containing the fixed points 1 to 4, as well as connecting segments $21v$, $23v$ and $24v$. The connecting segment $21v$ interconnects the connecting planes $1v$ and $2v$. What is involved here is the development of a lateral cylinder surface, as described in FIG. 2. The connecting segment $23v$ interconnects the connecting planes $2v$ and $3v$, while the connecting segment $24v$ interconnects the connecting planes $2v$ and $4v$. The connecting segments $23v$ and $24v$ are also developments of a lateral cylinder surface.

The dimensions of the connecting planes $1v$ to $4v$ and of the connecting segments $21v$, $23v$ and $24v$, which form a printed circuit board coarse design 30, can firstly be freely selected within wide limits as long as they do not exceed the inner dimensions of the housing 10. However, it must be ensured that the printed circuit board contour is selected in the further method such that no overlapping region of connecting segments is arranged inside the printed circuit board contour. The consequence of this would be that the flexible printed circuit board would have to be bent repeatedly in such regions, bending which can lead in general to plastic deformation and cracks.

Figure 4:
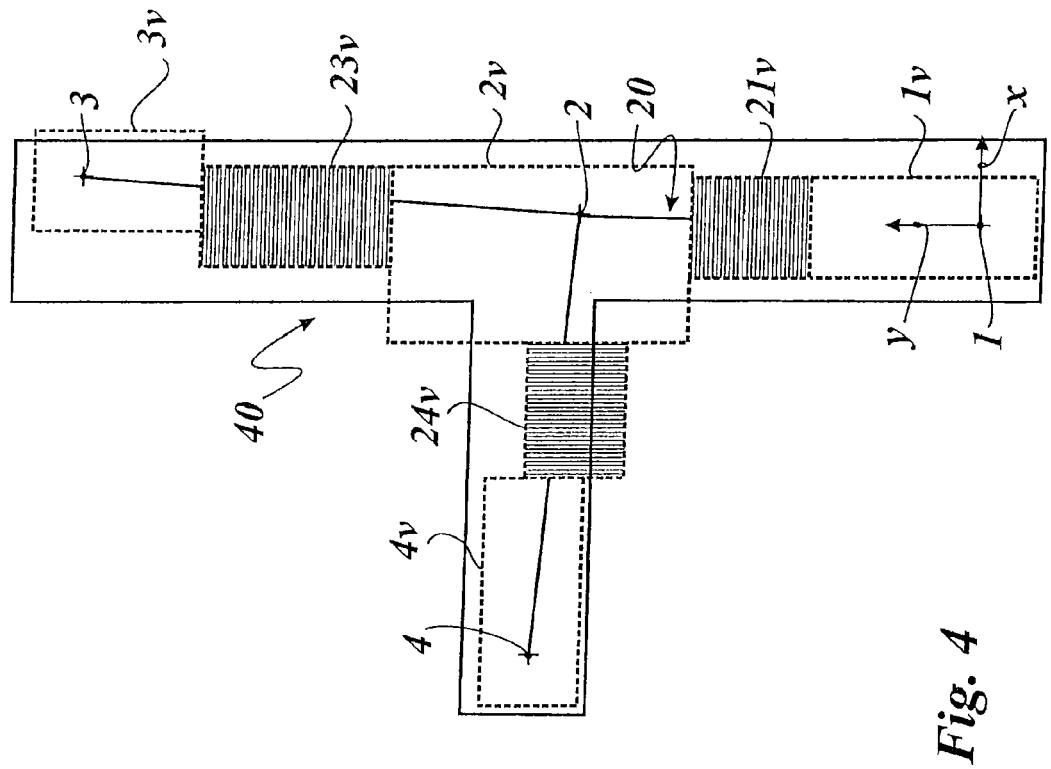
FIG. 4 is a schematic plan view of a second printed circuit board design developed from the first printed circuit board design in FIG. 3.

FIG. 4 shows a printed circuit board design 40 (illustrated with a closed line in FIG. 4) having a printed circuit board contour of substantially T-shaped design, it now being possible to develop a printed circuit board layout inside the printed circuit board contour. For the purpose of comparison, the printed circuit board coarse design 30 illustrated in FIG. 3 is depicted by dotted lines. The printed circuit board layout can be developed with the aid of a prescribed circuit diagram and a selection of available components, but with at least the geometric dimensions of the selected components needing to be known and to be capable of being retrieved and arranged in the form of "virtual" components. The virtual components are advantageously stored in the data memory of a computer. The creation of such a printed circuit board layout essentially comprising the arrangement of components and the laying of conductor tracks can be performed in a conventional computer aided way, it being possible for the geometric data of the virtual components to be retrieved from the data memory of the computer. The retrieval can be performed, for example, in such a way that the contours of the components are illustrated in a graphic development environment, and that it is possible for the components to be retrieved and positioned by means of a "mouse click", for example.

Figure 5:
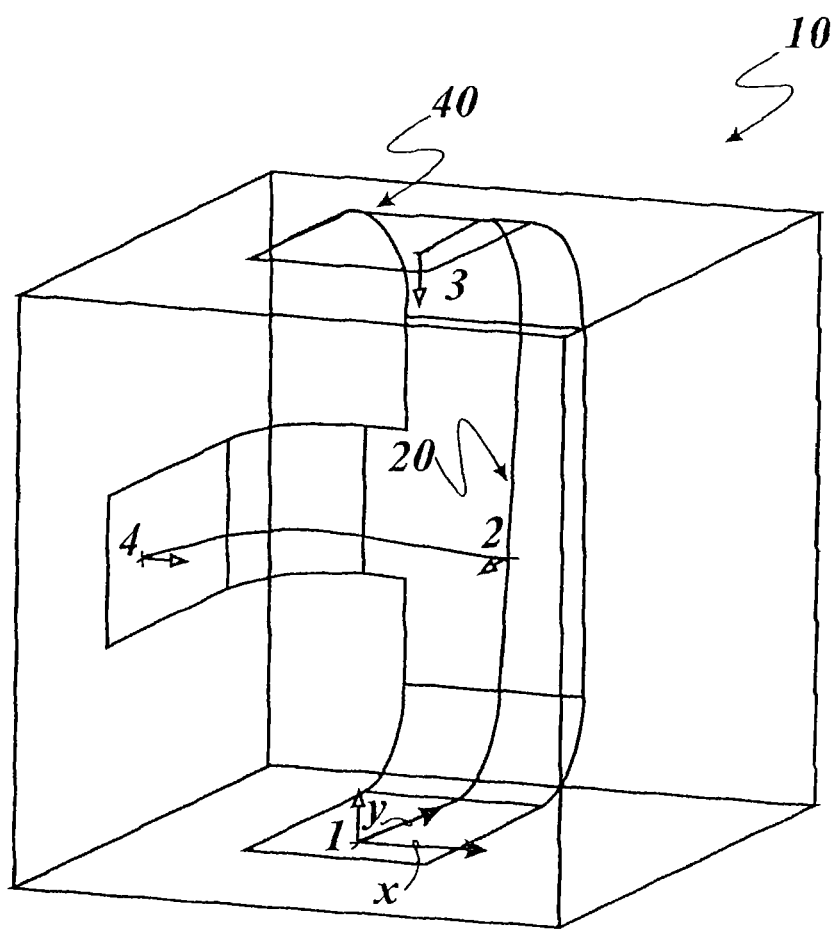
FIG. 5 is a three dimensional schematic of the printed circuit board design in FIG. 4 transferred back into the housing in FIG. 1.

FIG. 5 shows the printed circuit board design 40 transferred back into the housing 10 (see FIG. 1), the virtual components arranged on the flexible printed circuit board not being illustrated. A further step is now provided, namely that of checking the printed circuit board design 40 transferred into the housing 10 and populated with virtual components in the three-dimensional display for collisions between the virtual components, on the one hand, and the printed circuit board contour, on the other hand, and the inner contour of the housing, and undertaking corrections of the printed circuit board design 40, if appropriate. It is also provided to determine the function of the reciprocal influences disturbing the circuit, for example of components or else of conductor tracks. If collisions or disturbing influences are present, the printed circuit board layout and/or the selection of the components in the 2D development environment illustrated in FIG. 4 is repeated, and the improved printed circuit board design in the 3D environment (FIG. 5) is then checked once again as described. These steps are repeated until a functioning printed circuit board design is determined.

In the case of the inventive method, the 2D development environment and the 3D development environment can advantageously be provided by a common computer program that provides and manages data from one or more data memories. The two development environments can advantageously be provided on one or more screens.

LIST OF REFERENCE NUMERALS 1 to 4 Fixed point
1v to 4v Connecting plane
10 Housing
20 Skeleton model
21v Connecting segment
23v Connecting segment
24v Connecting segment
30 Printed circuit board coarse design
40 Printed circuit board design

The invention claimed is:

1. A method for the computer-aided construction of a flexible printed circuit board that is arranged in a housing of a device, the method comprising the steps of:
   a) creating a 3D model of the housing,
   b) determining fixed points of the printed circuit board with specification of the normal unit vector pointing away from the top side of the flexible printed circuit board, and of the throughflow direction, by using a computer,
   c) determining connecting planes that contain the fixed points,
   d) calculating a skeleton model of the printed circuit board, the line of intersection of the connecting planes having the fixed points being determined between two neighboring fixed points with a different normal unit vector,
   e) replacing the line of intersection by a connecting segment, the connecting planes forming the line of intersection merging tangentially into the connecting segment,
   f) creating a development of the skeleton model,
   g) defining a preliminary printed circuit board contour including the skeleton model,
   h) creating a printed circuit board design, comprising a defined printed circuit board contour and a printed circuit board layout, in the development,
   i) inserting virtual components into the printed circuit board design,
   k) back transferring the printed circuit board design populated with the virtual components into the 3D model of the housing,
   l) determining and correcting the collisions between the virtual components and the printed circuit board contour or the inner contour of the housing in the 3D model of the housing or between the virtual components among one another, or the printed circuit board contour with itself,
   m) repeating the steps h) to k) until no more collisions occur, the steps a) to m) being executed in the above named sequence or in another sequence.

2. The method as claimed in claim 1, wherein, in method step a), the 3D model of the housing is stored in a data memory of the computer, and wherein, in method step b), the fixed points of the printed circuit board are taken from the data memory.

3. The method as claimed in claim 1, wherein the skeleton model calculated in method step d) is stored in the data memory of the computer.

4. The method as claimed in claim 1, wherein the virtual components are stored in the data memory of the computer.

5. The method as claimed in claim 1, wherein the connecting segment is designed as a curved surface.

6. The method as claimed in claim 5, wherein the curved surface is designed as a cylindrical surface.

7. The method as claimed in claim 5, wherein the connecting segment is designed as a conical surface.

8. The method as claimed in claim 5, wherein the connecting segment is designed as a helical surface.

9. The method as claimed in claim 5, wherein the connecting segment is designed as a spiral surface.

10. The method as claimed in claim 5, wherein radii of curvature are selected that are larger than the radius of curvature and in which the linear elasticity range of the printed circuit board material is departed from for a predetermined printed circuit board thickness.

11. The method as claimed in claim 10, wherein permissible radii of curvature are selected from a preference table.

12. The method as claimed in claim 1, wherein two consecutive parallel connecting planes are connected by an orthogonal connecting plane.

13. The method as claimed in claim 1, wherein two consecutive nonparallel connecting planes are connected by a twisting surface.

14. The method as claimed in claim 13, wherein the twisting surface is formed by a twisting radius that is larger than the twisting radius for which the linear elasticity range of the printed circuit board material is departed from.

15. The method as claimed in claim 1, wherein the printed circuit board contour is selected such that no overlapping region of connecting segments is arranged inside the printed circuit board contour.

16. The method as claimed in claim 1, wherein, in the method step l), impermissible mutual electromagnetic and/or thermal influences of the components and/or conductor tracks arranged on the flexible printed circuit board are determined and corrected.

17. The method as claimed in claim 1, wherein the method is applied to ribbon cable.

18. The method as claimed in claim 1, wherein the method is applied to circular conductor cable bundles.

* * * * *